July 5, 1966  C. B. BLAIR  3,259,260

BALE HANDLING APPARATUS

Filed April 28, 1965  3 Sheets-Sheet 1

INVENTOR.
CALVIN B. BLAIR
BY
Fishburn and Gold
ATTORNEYS

July 5, 1966 C. B. BLAIR 3,259,260
BALE HANDLING APPARATUS
Filed April 28, 1965 3 Sheets-Sheet 2

INVENTOR.
CALVIN B. BLAIR
BY
Fishburn and Gold
ATTORNEYS

INVENTOR.
CALVIN B. BLAIR

United States Patent Office 3,259,260
Patented July 5, 1966

3,259,260
BALE HANDLING APPARATUS
Calvin B. Blair, Box 76, Barnard, Kans.
Filed Apr. 28, 1965, Ser. No. 451,519
10 Claims. (Cl. 214—147)

The invention relates to material handling devices and, more particularly, to bale pick-up and loading apparatus.

The principal objects of the present invention are: to provide bale handling apparatus which may be driven at relatively high speeds through a field while receiving and grasping bales; to provide such apparatus which is adapted to alternately receive individual bales lying in the field or multiple bales which have been accumulated into groups; to provide such apparatus which is easily mounted on a conventional self-propelled farm tractor or the like having a load elevator; to provide a baled hay pick-up, transporting, off-loading and stacking device which does not pierce or otherwise seriously disturb the bales; to provide such apparatus which is easily remotely controlled by a tractor operator for handling bales singly or in groups; to provide such a device which is easily manipulated to permit crosstie or lap stacking for maximum storage stability and weather resistance; and to provide such apparatus which is relatively simple and inexpensive in construction and yet highly versatile and rugged in use.

Other objects and advantages of this invention will become apparent from the following description taken in connection with the accompanying drawings wherein are set forth by way of illustration and example of certain embodiments of this invention.

Figure 1:
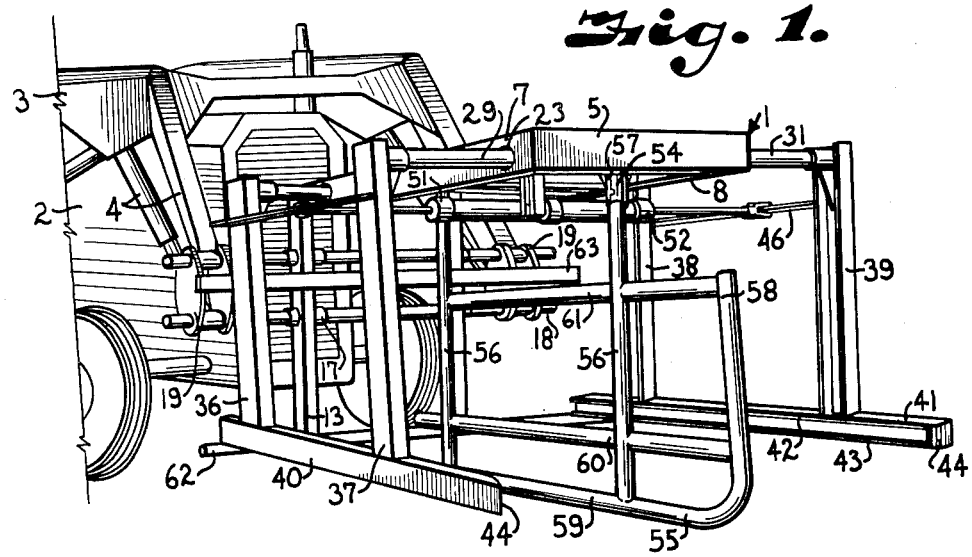
FIG. 1 is a perspective view showing bale handling apparatus secured to a load elevator on a tractor and in field pick-up position.

Referring to the drawings in more detail:

The reference numeral 1 generally indicates a bale pick-up, loading and unloading apparatus embodying this invention. The apparatus 1 is particularly designed for use on a conventional self-propelled farm tractor 2 having a load elevator 3 with normally forwardly extending elongated arms 4 arranged to be moved from a position near the ground to a more elevated position.

The apparatus 1 comprises a normally horizontally extending rigid frame 5 having a front channel member 6 extending transversely and forwardly of the tractor 2 and first and second side channel members 7 and 8. The side channel members 7 and 8 respectively have front end portions 9 and 10 rigidly secured to opposite ends of the front channel member 6 and extend rearwardly therefrom in parallel spaced apart relation longitudinally of the tractor 2. Structural members 11 and 12 extend between the channel members 7 and 8 to add rigidity to the frame 5. A pair of elongated rigid depending support members 13 and 14 have upper ends thereof respectively rigidly secured to the rear ends 15 and 16 of the side channel members 7 and 8. The support members 13 and 14 have suitable collars 17 engaged therewith for receiving elongated transverse bars 18 of a mounting bracket 19 engaged with the elevator arms 4 for supporting the frame 5 normally horizontally and above the ground.

A first pair of spaced apart parallel guide tubes 20 and 21 extend parallel to the front channel 6 and are secured between the side channel members 7 and 8. The side channel member 7 has a pair of spaced apart openings 22 and 23 therethrough coinciding respectively with open ends of the tubes 20 and 21. A second pair of spaced apart parallel guide tubes 24 and 25 extend parallel to the front channel 6 and are secured between the side channel members 7 and 8 respectively adjacent the first tubes 20 and 21. The second side channel member 8 has a pair of spaced apart openings 26 and 27 therethrough coinciding respectively with the open ends of the tubes 24 and 25 in the same manner as the openings 22 and 23 coincide with the tubes 20 and 21 on the opposite side of the frame 5.

Figure 3:
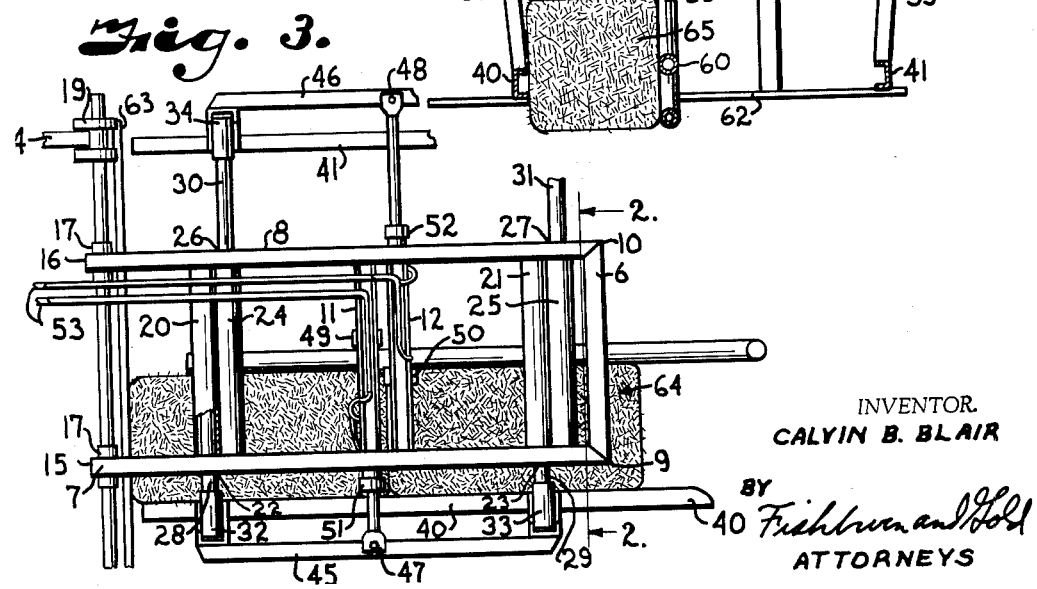
FIG. 3 is a fragmentary top view of the apparatus of FIG. 1 with stacked bales clamped in one side thereof.

Elongated rods respectively designated 28, 29, 30 and 31 extend through the respective side channel openings 22, 23, 26 and 27. The rods 28, 29, 30 and 31 have ends 32, 33, 34 and 35 projecting outwardly of the respective side channels 7 and 8 and slidably telescopically received and supported in the respective guide tubes 20, 21, 24 and 25 for reciprocal movement of the outer ends transversely toward and away from the frame 5. Straight depending rigid elongated struts 36, 37, 38 and 39 have upper ends respectively rigidly secured to the ends 32, 33, 34 and 35 and taper inwardly in parallel pairs on each side of the frame 5 toward the center of the frame as they extend downwardly. Elongated grip channels 40 and 41 are rigidly secured to the lower ends of the respective pairs of struts 36, 37 and 38, 39 and extend parallel to the side channel members 7 and 8 forwardly and rearwardly beyond the respective strut lower ends as best illustrated in FIGS. 1 and 3.

The grip channels 40 and 41 are each located at the same level beneath the frame 5 and have parallel upper and lower legs 42 and 43 extending inwardly toward the opposing grip channel for contacting and retaining bales against downward motion as explained more fully hereinafter. The grip channels 40 and 41 each has a leading end 44 which tapers inwardly and blending with the respective upper and lower legs 42 and 43 so as to present a funnel-like configuration for directing bales between the channels 40 and 41 when the apparatus 1 is urged forwardly across a field or into a bale stack by the tractor 2.

Elongated bars 45 and 46 extend between and are secured to the respective pairs of struts 36, 37 and 38, 39. The bars 45 and 46 are positioned adjacent the strut upper ends and each has a horizontal pivotable connector respectively designated 47 and 48 secured thereon intermediate the struts. Stub supports 49 and 50 depend from the frame structural members 11 and 12. A pair of hydraulic cylinders 51 and 52 respectively have the rear end thereof secured to the stub supports 49 and 50 and a piston rod extending transversely outwardly beneath the respective side channel members 7 and 8 and secured to the respective connectors 47 and 48. Upon the reciprocation of the cylinder piston rods, the grip channels 40 and 41 are moved horizontally toward and away from the frame 5. Hydraulic lines 53 are connected to the respective cylinders 51 and 52 and carry hydraulic fluid for producing the piston rod reciprocation. The lines 53 communicate with conventional hydraulic fluid pressure members and controls (not shown) located within reach of the tractor operator.

Front and rear spaced apart sockets 54 are fixed to portions of the frame 5 centrally between the side channel member 7 and 8 and open downwardly. A rigid center guide member 55 has a pair of vertically extending mounting shafts 56 extending upwardly into the respective sockets 54. In the illustrated example, clamp screws 57 extend into the sockets 54 and are adapted to engage the upper ends of the mounting shafts 56 for retaining same in the sockets 54, thus supporting the center guide member 55 in a depending position between the respective channels 40 and 41.

The center guide member 55 includes a vertical deflection bar 58 positioned forwardly of the grip channels 40 and 41 and an elongated horizontal running bar 59 extending parallel to and below the grip members 40 and 41 for slidably contacting the ground. The center guide member 55 includes first and second intermediate bars 60 and 61 extending parallel to and spaced above the running bar 59. The first intermediate bar 60 is located at the same elevation as the grip channels 40 and 41 and the second intermediate bar 61 is spaced above the first intermediate bar 60 approximately the height of a bale lying on the ground.

Pusher bars 62 and 63 are secured to the support members 13 and 14 and extend transversely of the side channel members 7 and 8. The pusher bars 62 and 63 are located at the rear of the frame 5 and at respective elevations for engaging the first and second layer of bales stacked on the ground when the center guide member 55 is sliding along or near the ground.

By way of operation, bales are commonly deposited on the ground in windrows by a mobile baler. The bales may be dropped singly in spaced apart relation or often a bale accumulator is drawn behind the baler which accumulates, for example, a group of 4 bales, one stacked on another and in end-to-end relation. Assuming that single bales are dropped in the field, the apparatus 1 is driven along the bale windrow with the grip channels 40 and 41 extended outwardly of the frame 5 to an appropriate position determined by bale width. The runner bar 59 is normally permitted to slide along the ground as the tractor is driven forwardly so as to properly space the grip channels above the ground but below the center of the bales for efficient pick-up. The bales are approached longitudinally and the first bale is allowed to enter between the center guide member 55 and one of the grip channels 40 or 41 whereupon the end of the bale comes to rest against the lower pusher bar 62. The deflection bar 58 helps to move the bale into longitudinal position for entry if it is angularly displaced. The pusher bar 62 urges the bale slidably along the ground while an additional bale may come to rest against the pusher bar 62 between the center guide member 55 and the other grip channel, both bales then continuing to slide across the ground longitudinally urged by the pusher bar 62 and trapped between the center guide member and the respective grip channels. An additional bale may then be received on each side of the center guide member 55 and is slidably urged along the ground by end contact with the bale already received in the apparatus. Thus, four bales at ground level may be received between the respective grip channels 40 and 41 whereupon the cylinders 51 and 52 are actuated to urge the grip channels 40 and 41 toward each other urging the bales against the center guide member 55. When the bales are gripped, the entire apparatus may be raised by the elevator arms 4 and the tractor driven at high speed to a stack or truck bed whereupon the four bales may be placed thereon in a group and cross-tied with other bales by overlapping, if so desired. When releasing the bales on the stack or truck bed, the grip channels 40 and 41 are moved outwardly of the frame 5 whereupon the bales are free to move downwardly with respect to the apparatus. The small spacing which may exist between the respective pairs of end-to-end positioned bales, due to the width of the center guide member 55, may be closed by urging one of the deposited pairs laterally toward the other pair through contacting the exposed side of the pair with the outside surface of one of the grip channels.

The sliding fit between the elongated rods 28, 29, 30 and 31 and tubes 20, 21, 24 and 25 is relatively loose to permit a slight rotation or twisting of the grip channels 40 and 41 in a horizontal plane so that both bales on one side of the apparatus may be gripped even though the bales vary substantially in transverse dimension or width. The pivot connectors 47 and 48 yield to permit this slight rotation. It is to be understood, however, that this is not sufficient to permit excess cocking of the grip channels 40 and 41 in the event that a single bale resting against the pusher bar 62 is clamped rather than filling the space between one grip channel and the center guide member with two bales at ground level.

Figure 2:
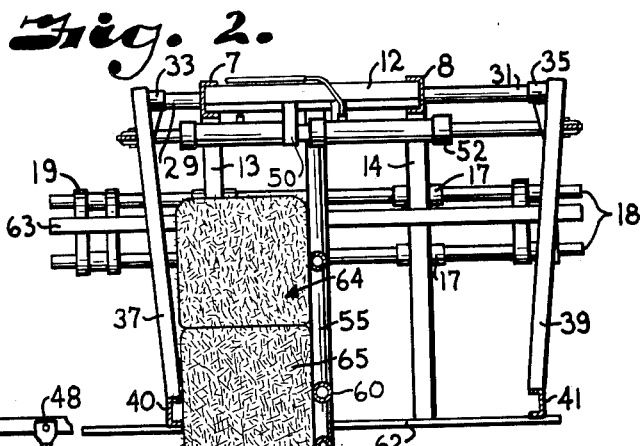
FIG. 2 is a transverse cross-sectional view through the apparatus of FIG. 1 taken on the line 2—2, FIG. 3, showing stacked bales clamped in one side thereof with the other side open.

If a bale accumulator is used behind the baler so as to leave, for example, groups of four bales in the field in spaced apart positions, the apparatus is used in the same manner as noted above except that two groups of four will be picked up rather than four individual bales. When the first group of four bales enters between the center guide member and one of the grip channels, the respective layers of bales come to rest at the rear ends thereof against the pusher bars 62 and 63. FIGS. 2 and 3 show a single group 64 of four bales received between the center guide member 55 and the grip channel 40. The grip channel 40 is shown in gripped position urging the lower bales 65 of the group 64 against the center guide member 55 so that the group may be raised above the ground for transport and deposit on a stack or truck bed.

In order to unload from a stack or truck bed, the center guide member 55 is removed from the apparatus 1 by releasing the screw clamps 57. Then the forward ends 44 of the grip channels 40 and 41 may be easily inserted between bales in the top or succeeding layer in a bale stack so as to pick up two (side-by-side), four (side-by-side and end-to-end) or eight bales (four upon four) in a single operation for removal from the stack. The pressure exerted between the grip channels 40 and 41 is sufficient to securely retain the bales therebetween by bridging so that there is little or no danger of the bales dropping downwardly when the grip channels 40 and 41 are urged inwardly under pressure, even though there is no center guide member therebetween.

Figure 4:
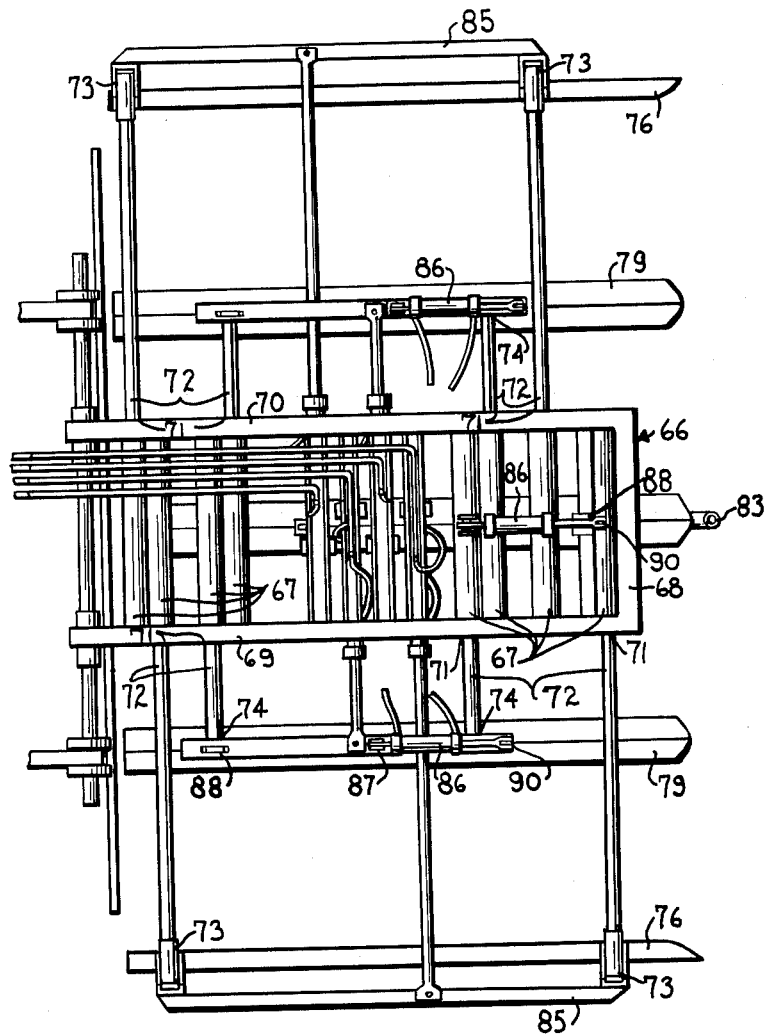
FIG. 4 is a top view of a modified form of this invention having greater capacity than the embodiment of FIG. 1.
Figure 5:
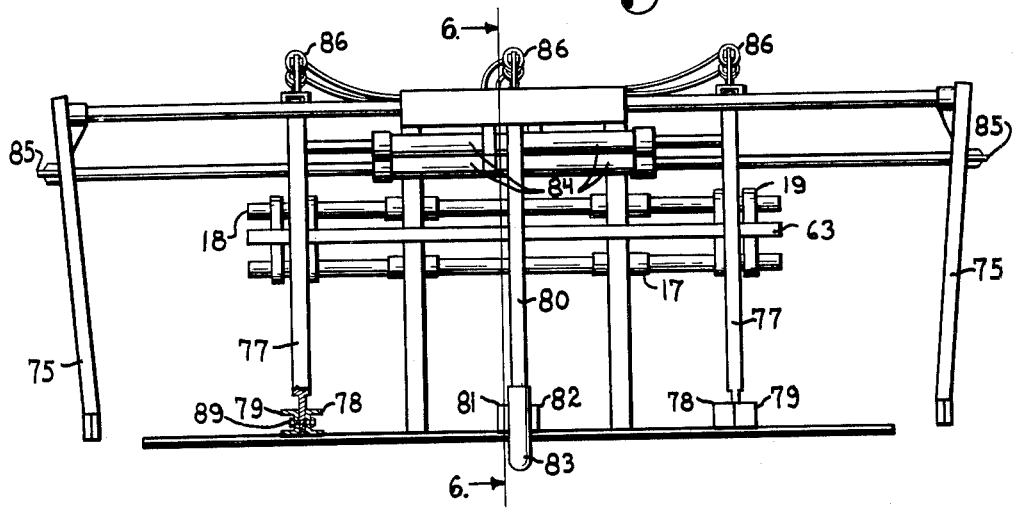
FIG. 5 is a front elevational view of the embodiment of FIG. 4.
Figure 6:
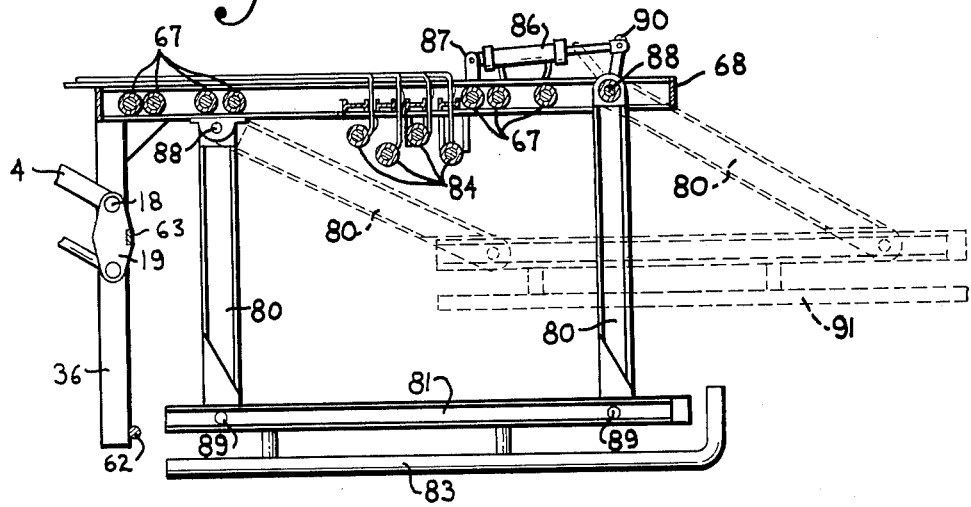
FIG. 6 is a schematic cross-sectional showing taken generally on the line 6—6, FIG. 5, illustrating typical structure for withdrawing gripping or guide members to facilitate unloading bales from a stack.

A second embodiment of this invention is illustrated in FIGS. 4, 5 and 6 and is generally similar in structure and operation to the above-described embodiment except that a greater number of grip channels or members are used. Also, the center or intermediate bale gripping members may be withdrawn upwardly for unstacking or off-loading rather than removed. Referring to FIGS. 4, 5 and 6, the frame 66 includes four pairs of spaced apart guide tubes 67 extending parallel to the front channel 68 and secured between the side channel members 69 and 70. The side channel members 69 and 70 each have four spaced apart openings 71 respectively coinciding with open ends of two pairs of tubes 67. Elongated rods 72 extend through each of the channel openings and outwardly of the frame 66 terminating in outer ends 73 and intermediate ends 74 spaced horizontally laterally different distances from the side channels 69 and 70. The outer ends 73 support depending inwardly tapered struts 75 which, in turn, support outer grip channels 76 similar to the grip channels 40 and 41. The pairs of intermediate ends 74 respectively support depending struts 77 which terminate at lower ends thereof in opposed double grip channels 78 and 79 so as to be adapted to engage and grip bales on both sides thereof. Center struts 80 depend downwardly from the frame 66 and support opposed grip channels 81 and 82 for cooperating with the respective inwardly facing channels 78 for gripping bales therebetween. The grip channels 81 and 82 have a suitable runner bar 83 extending downwardly therefrom for spacing the apparatus above the ground in the manner of the runner bar 59 described above.

Four hydraulic cylinders 84 are secured to the frame 66 and have piston rods respectively extending outwardly and terminating generally between each pair of rod outer ends 73 and 74. Elongated bars 85 form a connection between the respective pairs of ends 73 and 74 and the respective piston rods whereupon the struts 75 and 77 may be reciprocated individually transversely of the frame 66.

The embodiment described with respect to FIGS. 4, 5 and 6 is used for bale pick-up in the same manner as the embodiment first described; however, it will be noted that 8 single layer bales may be clamped at one time or 16 bales when stacked one on the other. When unloading with the last described embodiment, the intermediate struts 77 and center strut 80 may be individually or together withdrawn upwardly rather than removed. This is accomplished by providing suitable hydraulic cylinders 86 mounted above each of the respective pairs of struts 77 and 80 and anchored to the frame or joining members by supports 87. The struts 77 and 80 are pivoted to the frame or joining members at 88 and also to the respective grip channels at 89. Thus, in each instance a parallelogram frame is formed which may pivot upwardly while the grip channel 79 remains substantially parallel to the ground. A lever 90 is rigidly secured to one of the struts of the pairs 77 and 80 and pivotedly connected to the reciprocating rod of the respective cylinder 86 whereupon the actuation of the cylinder causes the parallelogram to move to the position 91 shown in broken lines, FIG. 6. When the intermediate and center struts 77 and 80 are thus pivoted upwardly, the apparatus may be used for gripping four rows of bales between the outer grip channels 76 for unloading. It may be desirable to pivot only the intermediate struts 77, leaving the center strut 80 as additional supporting structure when loose bales are handled. In the illustrated structure, the intermediate and center struts are pivotable upwardly only sufficiently to allow a single layer of bales thereunder for unloading; however, it is to be understood that variations in structure may be evident to those skilled in the art which will permit the center and intermediate grip channels to be withdrawn upwardly a distance which will permit double layers of bales between the outer grip channels for unloading 16 bales in one operation.

It is to be further understood that although certain forms of this invention have been illustrated and described, it is not to be limited thereto except insofar as such limitations are included in the claims.

What is claimed and desired to secure by Letters Patent is:

1. Apparatus for handling longitudinally end-to-end arranged bales for use on a self-propelled tractor having a load elevator with arms arranged to be moved from a position near the ground to a more elevated position, said apparatus comprising:
   (a) an elevated frame having a forward end and a rear end, support structure secured to said frame, mounting means secured to said support structure and adapted for engagement with said elevator arms for supporting said frame a variable distance above the ground and longitudinally of said tractor,
   (b) support means, guide means mounted on said frame and adapted to support said support means for reciprocal movement transversely of said frame, rigid strut means supported by said support means and depending below the elevation of said frame,
   (c) a first elongated grip member mounted on a lower portion of said strut means and extending substantially longitudinally of said tractor, a second elongated grip member supported by said frame in substantially parallel spaced apart laterally opposed relation to said first grip member and at substantially the same elevation, motive means operably engaged between said frame and said first grip member for selectively reciprocating said first grip member toward and away from said second grip member, and
   (d) pusher means retained against rearward movement with respect to said frame and extending into the path defined by said grip members at approximately the same elevation and rearwardly thereof, said pusher means and grip members forming a forwardly and downwardly open structure for longitudinally receiving and pushing a plurality of bales lying on the ground as said apparatus is driven forwardly by said tractor and clamping end-to-end arranged bales between said grip members for elevation above the ground.

2. The apparatus as set forth in claim 1 wherein:
   (a) said first grip member is greater in length than the length of a single bale and said guide means and support means are relatively movable so as to permit a slight horizontal rotation of said first grip member for accommodating variations in bale width upon clamping.

3. The apparatus as set forth in claim 1 wherein:
   (a) said guide means and support means and strut means are provided for mounting said second grip member on said frame, and including,
   (b) motive means operably engaged between said frame and said second grip member whereby said grip members may be individually reciprocated toward and away from each other.

4. The apparatus as set forth in claim 3 including,
   (a) a rigid center guide member rigidly secured to said frame against lateral motion and depending therefrom between said grip members forming a forwardly and downwardly open structure on each side of said center guide member for individually receiving and pushing bales lying on the ground and individually clamping bales between the respective grip members and the center guide member.

5. The apparatus as set forth in claim 4 including,
   (a) pivotal mounting members for pivotally mounting said center guide member on said frame, but restricting said center guide member against lateral motion, and
   (b) motive means operably engaged with said center guide member for selectively pivoting said center guide member out of position between said grip members.

6. Bale pick-up and loading apparatus for use on a self-propelled tractor having a load elevator with forwardly extending elongated arms arranged to be moved from a position near the ground to a more elevated position, said apparatus comprising:
   (a) a normally horizontally extending rigid frame having a front structural member extending transversely of said tractor, a first and a second side structural member respectively having a front end portion rigidly secured to opposite ends of said front structural member and extending rearwardly therefrom in parallel spaced apart relation longitudinally of said tractor, elongated rigid depending support members having upper ends thereof respectively rigidly secured to rear ends of said side structural members,
   (b) a mounting bracket secured to said depending support members and adapted for engagement with said elevator arms for supporting said frame above the ground, a first and second pair of spaced apart parallel guide tubes extending parallel to said front structural member and secured between said side structural members and respectively opening at opposite sides of said frame,
   (c) elongated rods slidably extending into each of said tubes and having ends projecting outwardly of said side structural members, an elongated depending rigid strut for each of said rods and having an upper and a lower end, said struts being respectively rigidly secured at the upper ends thereof to the outer ends of said rods and extending downwardly in parallel pairs, an elongated grip channel rigidly secured to the lower ends of each parallel pair of struts and extending parallel to said side structural members and in opposed relation, said grip channels being located at the same level below said frame and having parallel upper and lower legs extending inwardly toward the center of said frame for contacting bales, (d) an elongated bar extending between and secured to the struts of each parallel pair, said bars being positioned adjacent said strut upper ends and each having a horizontally pivotable connector thereon intermediate the respective pairs of struts, a pair of hydraulic cylinders respectively having one end thereof secured to said frame and extending transversely outwardly beneath said respective side structural members and having piston rods respectively secured to said connectors whereby the reciprocation of said piston rods results in the movement of said grip channels horizontally toward and away from each other, and (e) a pusher bar secured to said support members and extending transversely of said side structural members and at the rear of said grip members.

7. The apparatus as set forth in claim 6 including,
(a) a front and rear socket fixed to said frame centrally between said side structural members and opening downwardly,
(b) a rigid center guide member having a pair of vertical mounting shafts extending upwardly into said sockets, and means for removably retaining said mounting shafts in said sockets for supporting said center guide member in a depending rigid position between said grip channels,
(c) said center guide member including a vertical deflection bar positioned forwardly of said grip channels and an elongated running bar extending parallel to and below said grip channels for slidably contacting the ground,
(d) said center guide member including bar means at generally the same elevation as said grip channels for clamping bales between said center guide member and said respective grip channels.

8. Bale handling apparatus comprising:
(a) a rigid normally horizontally extending frame having opposed sides, support means on said frame and having mounting means for securing said frame to load elevator arms of a self-propelled tractor for supporting said frame a variable distance above the ground, (b) a pair of spaced apart support members movably mounted on said frame at each of said sides for simultaneous lateral reciprocal motion outwardly from one of said sides, each of said support members having a rigid elongated portion extending downwardly from the elevation of said frame, an elongated normally horizontal rigid grip member rigidly mounted on each pair of support members in opposed substantially equally elevated positions and spaced below the elevation of said frame, (c) motive means on said frame for laterally reciprocating said pairs of support members for clamping bales between said grip members beneath said frame, and (d) pusher means retained with respect to said frame and having a portion extending between said grip members at approximately the elevation thereof for pushing bales resting on the ground and received between said grip members.

9. The apparatus as set forth in claim 8 wherein:
(a) said support members are adapted to cooperate with said frame to permit a slight horizontal rotation of said grip members beneath said frame for accommodating variations in bale width upon clamping.

10. The apparatus as set forth in claim 8 including:
(a) a second pair of support members mounted on said frame at each of said sides for lateral reciprocal motion outwardly from said sides beyond said first named support members, said second pairs of support members extending downwardly from the elevation of said frame, an elongated grip member mounted on each of said second pairs of support members in opposed positions spaced outwardly of said respective first named grip members, and
(b) motive means on said frame for laterally reciprocating said last named support members for clamping bales between said last named grip members and first named grip members.

References Cited by the Examiner

UNITED STATES PATENTS

| 2,782,065 | 2/1957 | Lord | 294—87 |
| 3,155,415 | 11/1964 | Gale | 294—67 |
| 3,161,308 | 12/1964 | Kennett. | |

FOREIGN PATENTS

| 975,212 | 11/1964 | Great Britain. |

HUGO O. SCHULZ, *Primary Examiner.*